United States Patent [19]

Penberthy

[11] 4,195,981
[45] * Apr. 1, 1980

[54] MOLTEN GLASS HOMOGENIZER AND METHOD OF HOMOGENIZING GLASS

[76] Inventor: H. Larry Penberthy, 631 S. 96th St., Seattle, Wash. 98108

[*] Notice: The portion of the term of this patent subsequent to Sep. 12, 1995, has been disclaimed.

[21] Appl. No.: 905,337

[22] Filed: May 12, 1978

Related U.S. Application Data

[63] Continuation-in-part of Ser. No. 798,879, May 20, 1977, Pat. No. 4,113,460.

[51] Int. Cl.$^2$ .............................................. C03B 5/18
[52] U.S. Cl. ........................................ 65/134; 65/178; 65/346
[58] Field of Search ................. 65/178, 179, 180, 346, 65/134

[56] References Cited

U.S. PATENT DOCUMENTS 4,133,460  9/1978  Penberthy .............................. 65/178

Primary Examiner—Arthur D. Kellogg
Attorney, Agent, or Firm—LeBlanc, Nolan, Shur & Nies

[57] ABSTRACT

Disclosed is an improved stirrer for homogenizing glass in a forehearth of a glass furnace. It comprises a paddle having both upwardly and downwardly slanting holes that is reciprocated in the manner of a hoe back and forth across the forehearth. A novel drive linkage causes the paddle to raise and lower as it passes back and forth to produce a clawing action for better mixing.

20 Claims, 15 Drawing Figures

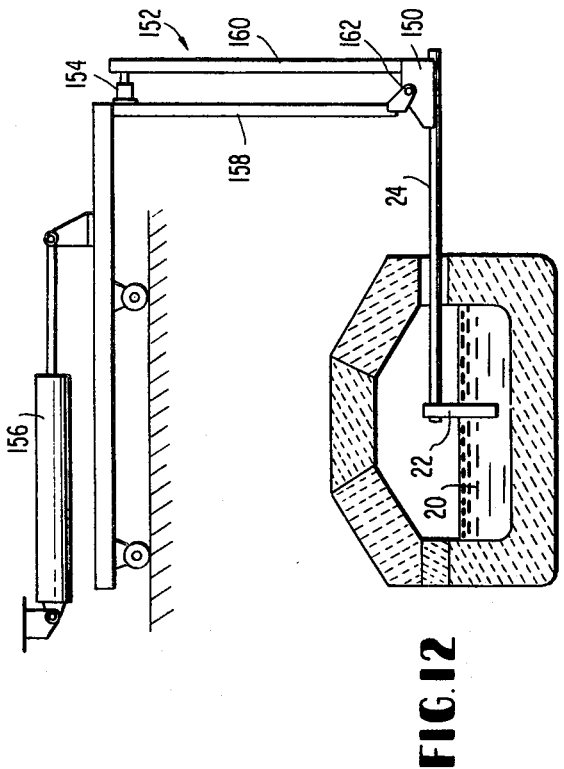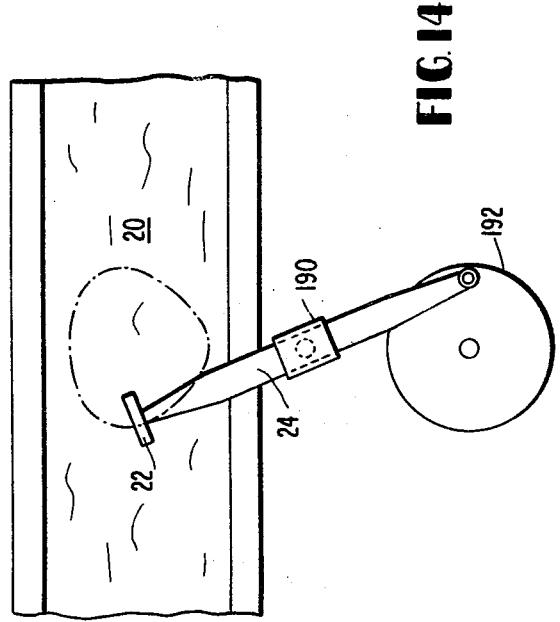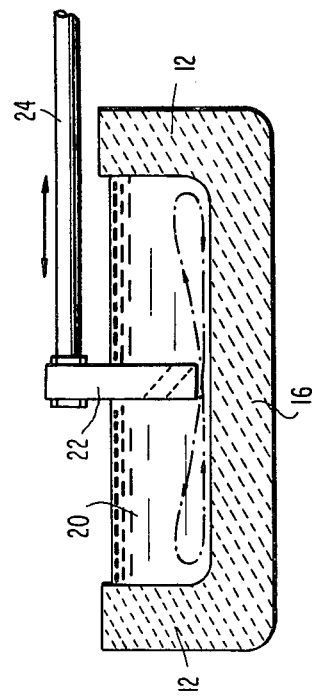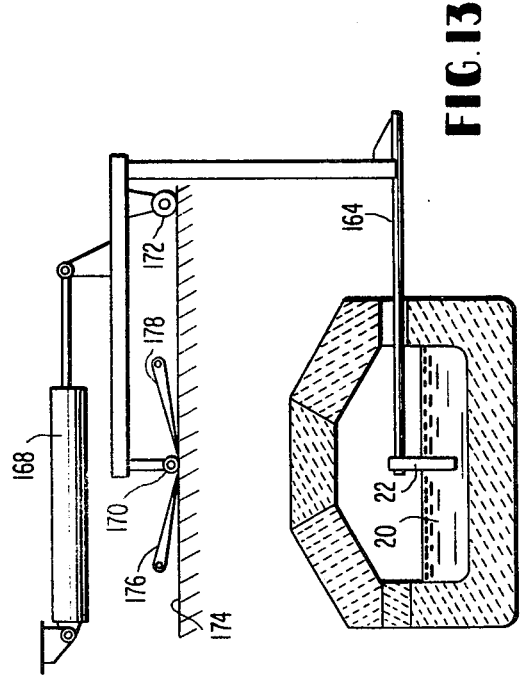

MOLTEN GLASS HOMOGENIZER AND METHOD OF HOMOGENIZING GLASS

This application is a continuation-in-part of my U.S. Pat. application Ser. No. 798,879, filed May 20, 1977, now U.S. Pat. No. 4,113,460.

This invention relates to a molten glass homogenizer and, more particularly, to a stirrer for the forehearth of a glass furnace which has an improved scraping and mixing action.

Furnaces for glass melting are normally made of refractory ceramic blocks which serve as the container for the glass. These blocks slowly dissolve into the glass and must be replaced after a period of time, normally from about one to seven years. These blocks are commonly made of alumina, silica, zirconia, and chromia in various combinations. A typical glass furnace block contains 49% alumina, 37% zirconia, 12% silica and 2% minor ingredients and impurities. This type is called AZS.

When the block material dissolves in the glass, a viscous liquid is formed which is denser than the common soda-lime-silica glass used, for example, for containers. This dense liquid slowly sinks to the bottom of the furnace basin, where it accumulates to build up a so-called "sludge" layer, from one to six inches thick. This sludge layer ultimately is carried through the throat of the furnace by the good glass, and travels as a semi-discrete layer along the bottom of the forehearth to the glass furnace orifice, still unmixed. In the formation of container glass, the streak of sludge appears in two main forms, generally called "cord".

One form of cord is a series of parallel, irregular lines, transparent, but visible because the streak of sludge has a higher index of refraction than the base glass. This form is called "catscratch cord." It is deleterious because it mars the appearance of the containers. Even more important the cord usually has a different coefficient of expansion and can seriously weaken the container. An even more serious form is when the cord is more voluminous and forms a sheet-like layer on the inner or outer surface or in the center of the wall of the container. This layer is often strong enough to cause the container to break spontaneously due to the difference in coefficients of expansion of the core and the base glass.

In addition to dissolving of the furnace blocks, there are other sources of cord. These include inadequate batch mixing, mistakes in the weighing of the ingredients, and variations in composition of the individual raw materials. All these sources usually result in general cordiness (inhomogeneity) of the glass which weakens the container.

Various methods have been tried in the industry to meet the cordiness problem with varying degrees of success. Bubbling, according to my U.S. Pat. No. 3,030,736, has often helped. Unfortunately, bubbling sets up convection currents in the melting basin where the glass is hotter and hence erosive on the bottom refractories. This can be guarded against by installing a panel of superior refractories at the bubbling locations, but this is expensive and inconvenient because a shut down of the furnace is required. Stirring according to my U.S. Pat. No. 3,053,517 has also been effective. However, this system has the disadvantage of partially blocking the flow of glass along the forehearth. Such arrangements are no longer acceptable to many manufacturers who have installed larger and faster machines that require more glass flow. Fifteen years ago, the pull through a forehearth was commonly over sixty tons of glass. Today pulls are commonly eighty to one hundred tons, and sometimes, even higher.

The present invention is directed to an improved arrangement for physically stirring the glass to reduce or eliminate the cordiness of molten glass and the problems it causes no matter what its source. The stirrer is located in the forehearth where the glass is cooler and hence, less aggressive in attack on the refractories. It can be installed with only a few hours of shut down and impedes the flow of glass by only a very small and perfectly acceptable amount.

In the present invention a blade is provided of refractory material and is vertically oriented and aligned substantially parallel to the direction of flow of the glass. In this way, its damming effect against the flow of glass is small. While the blade preferably is a flat plate, the blade could be of rounded configuration as a segment of a cylinder, or a shallow V-shape within the spirit of this invention. As will be obvious to those skilled in the art, the configuration or shape of the blade is not important so long as it accomplishes the purposes of this invention as will be explained. The blade is reciprocated across the width of the forehearth to accomplish mixing. It traverses close to each side wall in turn to mash away the glass, which is so to speak, held there normally by viscous drag. That glass moves along slowly as is well known in canal theory.

Important features of the present invention include the provision of a linkage whereby the movement of the blade effects a claw action such that the blade rises and drops to claw the bottom glass. Furthermore, the blade can be provided with upwardly and downwardly alternately slanting holes to help mix the glass as it moves through the forehearth. Even if not of different composition, the glass adjacent the side walls and bottom is of lower temperature than the more rapidly moving glass in the center and it is a purpose of this invention to mix the cooler glass with the hotter glass for improved thermal homogeneity.

It is, therefore, one object of the present invention to provide an improved molten glass homogenizer.

Another object of the present invention is to provide an improved stirrer for the forehearth of a glass furnace.

Another object of the present invention is to provide a stirring blade mechanism adapted to move transversely across a glass furnace forehearth to improve glass homogeneity.

Another object of the present invention is to provide a forehearth glass mixer with an improved up and down, or clawing action as it moves transversely across a glass forehearth.

Another object of the present invention is to provide an improved mixing blade or paddle having alternate upwardly and downwardly slanting apertures for improved mixing.

Another object of the present invention is to provide a simplified drive linkage for a forehearth glass stirrer.

These and other objects and advantages of the invention will be more apparent upon reference to the following specification, claims and appended drawings wherein:

FIG. 11 is a cross-section through a forehearth showing the transverse motion of the stirrer.

FIG. 12 shows a modified stirrer drive arrangement.

FIG. 13 shows a further modified stirrer driver.

FIG. 14 is a plan view of another modification in which the stirrer moves laterally.

Figure 1:
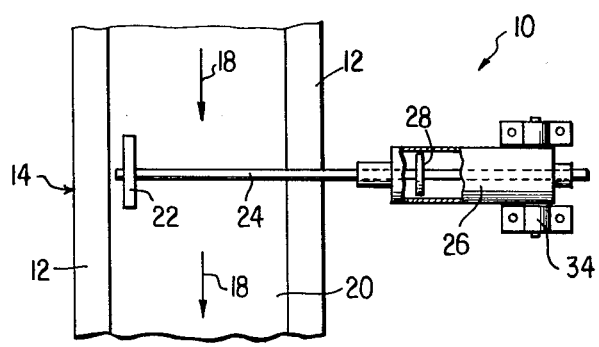
FIG. 1 is a partially schematic plan view of a simplified stirrer for a glass forehearth constructed in accordance with the present invention.

A stirrer mechanism generally indicated at 10 is illustrated in FIG. 1 as used in conjunction with the side walls 12 of a forehearth 14. The side walls 12 and bottom 16 form a channel through which the glass flows in the direction of the arrows 18. The channel 20 of glass is illustrated as traversed by a blade or paddle 22 mounted on a shaft 24 and reciprocated by a pneumatic cylinder 26 having a piston 28 attached to the shaft.

Figure 2:
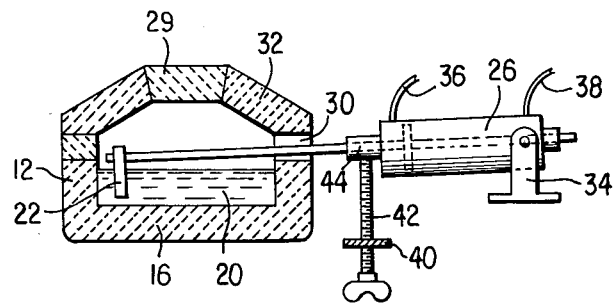
FIG. 2 is a side view of the stirrer of FIG. 1.
Figure 2A:
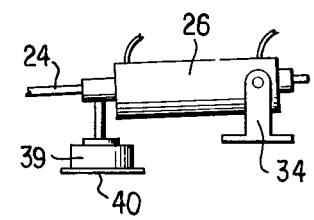
FIG. 2A is a partial side view showing a modified drive arrangement for the stirrer of FIG. 1.

FIG. 2 is a side view of the assembly showing the furnace forehearth as having a top wall 28 with an aperture 30 communicating with one of the top wall blocks or refractories 32. The blade 22 is removable from the forehearth for replacement by removing the cover block or refractory 32 and swinging the assembly upwardly. For this purpose, the cylinder 26 is pivoted to trunnions 34 and is shown as having air inlets 36 and 38 for driving the piston. A support 40 and screw 42 can be used to bear against a reduced diameter front portion 44 of the cylinder to adjust the height of the blade in the furnace. If desired, the screw 42 may be replaced by a second air cylinder or pneumatic cylinder and piston to automatically alter the level during each stroke to effect a clawing motion. This is shown in FIG. 2A where the screw is replaced by an air cylinder 39 and piston 41 for automatically raising and lowering the blade during each stroke.

Figure 3:
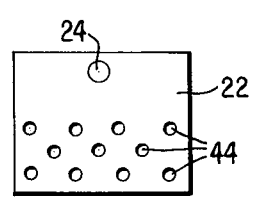
FIG. 3 is an end view of the paddle showing the paddle apertures.

The blade itself is shown at 22 in FIG. 3 as mounted on the end of the shaft 24 and can be provided with apertures 44. These apertures extend alternately upwardly and downwardly in a slanted direction through the blade to provide for improved mixing. The blade is preferably 6" wide by 9" high by 2" thick for a forehearth having a width of twenty-six inches and a glass depth of four to six inches. One suitable material is the AZS refractory composition previously described. Other material suitable for use in making the blade 22 include molybdenum and, in some cases, stainless steel. If desired, shaft 24 can be made hollow with water cooling (not shown) or may be molybdenum covered by a sheath of oxidation resistant material, such as stainless steel or Inconel.

Figure 4:
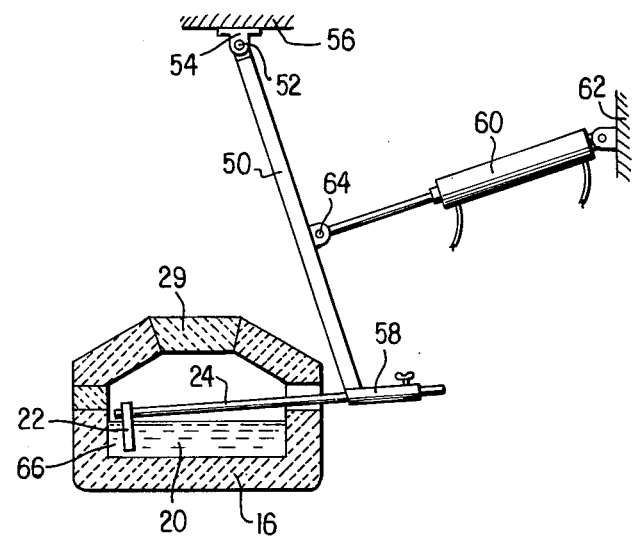
FIG. 4 is a partially schematic diagram of a simplified drive linkage arrangement for producing an improved clawing action of the paddle or blade as it moves across the forehearth.

FIG. 4 shows a modified drive linkage construction, particularly designed to give a clawing action to the blade 22 for improved mixing. In this arrangement, a swing arm 50 is hung from a shaft 52 held in pillow blocks 54 attached to a rigid frame 56. Blade shaft 24 is held at its outer end in a clamp 58. The assembly is reciprocated by a double acting air cylinder 60 pivoted to a rigid frame 62 and to the arm 50 as indicated at 64.

In the arrangement illustrated in FIG. 4, the blade 22 travels in an arc determined by the height of the shaft 52 above the floor of glass channel 20. When this distance is eight feet for a forehearth twenty-six inches wide, the bottom of blade 22 rises at both ends of the stroke about one-half inch above its level at the lowest point, which is when the blade is in the middle of its stroke directly under the shaft 52. This rise is beneficial in allowing glass 66 trapped between the blade 22 and the side wall of the forehearth to escape under the blade. This accomplishes some extra mixing when part of the glass 66 is caught on the return stroke and carried toward the center of the forehearth.

Figure 5:
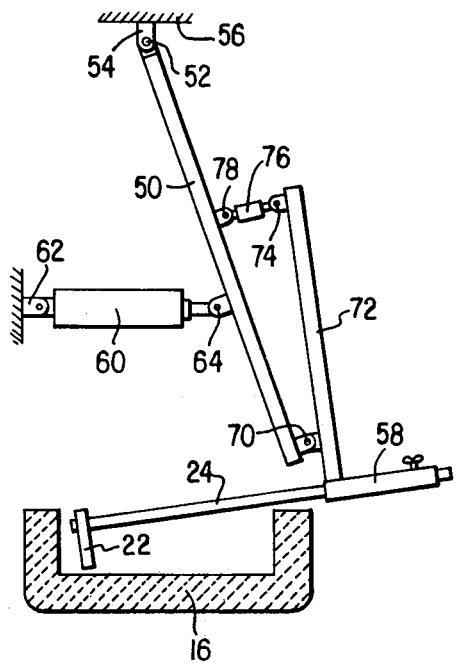
FIG. 5 is a partially schematic diagram of a modified drive linkage mechanism.

FIG. 5 shows a modified drive construction in which like parts bear like reference numerals. In this embodiment the pneumatic cylinder 60 is placed on the other side of arm 13 and this arm is modified by adding a pivot 70 carrying an auxiliary arm 72. The lower end of arm 72 is attached to the clamp 58 as before. The upper end of this auxiliary arm is pivoted at 74 to an auxiliary air cylinder 76 which is, in turn, connected by a pivot 78 to the main arm 50. Cylinder 76 is normally in the extended position raising blade arm 24.

Timed raising and lowering of the blade may be obtained with the arrangement illustrated in FIG. 5 by utilizing suitable limit switches (not shown). In such operation, the main cylinder 60 moves the blade 22 to the left in FIG. 5. At the end of the stroke, a limit switch engaged by one of the linkage members, releases the air supply to the cylinder 76 causing blade 22 to drop until it just barely misses the floor 16 of the forehearth. In this way, the blade 22 catches glass which was pushed under the blade as indicated at 66 in FIG. 4 as it nears the end of its outward stroke. About one fourth of the way back across the channel in FIG. 5, another limit switch is actuated by a linkage member, such as the main arm 50, restoring the air supply to the cylinder 76 and thus lifting blade 22 to prevent it from actually scraping the floor 16. Blade 22 completes its return stroke in the raised position and is then lowered as before for the next cycle. The raising and lowering action can be increased by decreasing the distance between shaft 52 and the floor 16 of the forehearth for increased side to center mixing. In the preferred embodiment, the limit switches are suitably positioned to be actuated by movement of the main arm 50 and tripping of these switches by the main arm appropriately controls the air supply to the cylinders in a well known manner.

Figure 6:
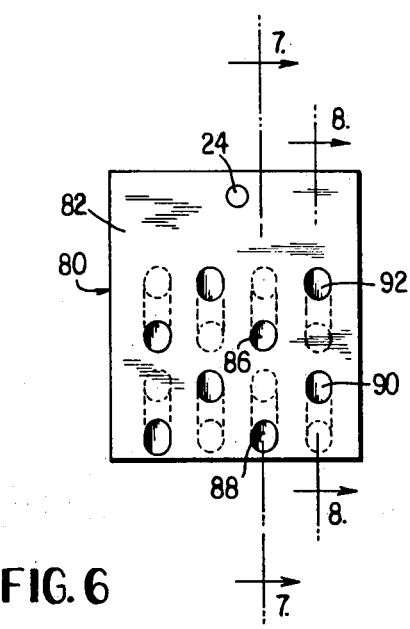
FIG. 6 is an enlarged view of a modified paddle construction.
Figure 7:
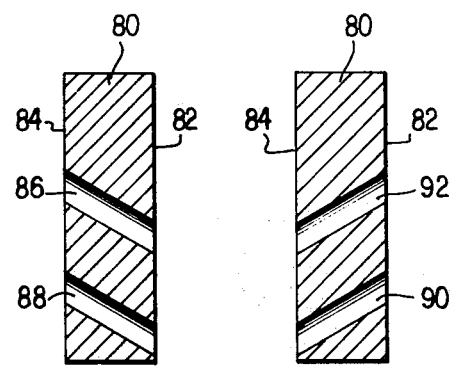
FIG. 7 is a cross section through the paddle taken along line 7—7 of FIG. 6.
Figure 8:
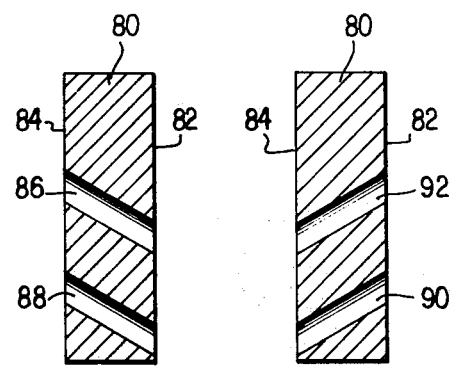
FIG. 8 is a similar cross section through the paddle taken along line 8—8 of FIG. 7.

FIG. 6 shows a modified blade construction 80 in which the apertures are positioned in rows and columns rather than staggered across the surface of the blade as illustrated in FIG. 3. However, in both embodiments, the apertures are alternately slanted upwardly and downwardly from front to back, as illustrated in FIGS. 7 and 8, to give improved mixing. The blade is illustrated in FIGS. 7 and 8 as comprising a front face 82 and a rear face 84 joined by upwardly slanting apertures 86 and 88 and alternate downwardly slanting apertures 90 and 92. In FIG. 6 when the blade moves toward the observer, molten glass enters the front end of the upwardly slanting apertures such as 86 and 88 and moves upwardly to exit from the rear surface 84 at a higher level. Similarly glass enters the alternate downwardly slanting apertures or holes 90 and 92 and passes downwardly to exit from the rear surface 84 at a new lower level. Similar glass movement takes place at the other corresponding holes in FIG. 6. In FIG. 3 the holes may alternate in the upward and downward direction in any desired fashion just so that some extend upwardly and some extend downwardly from the front face to provide a mixing action as the blade moves back and forth.

Figure 9:
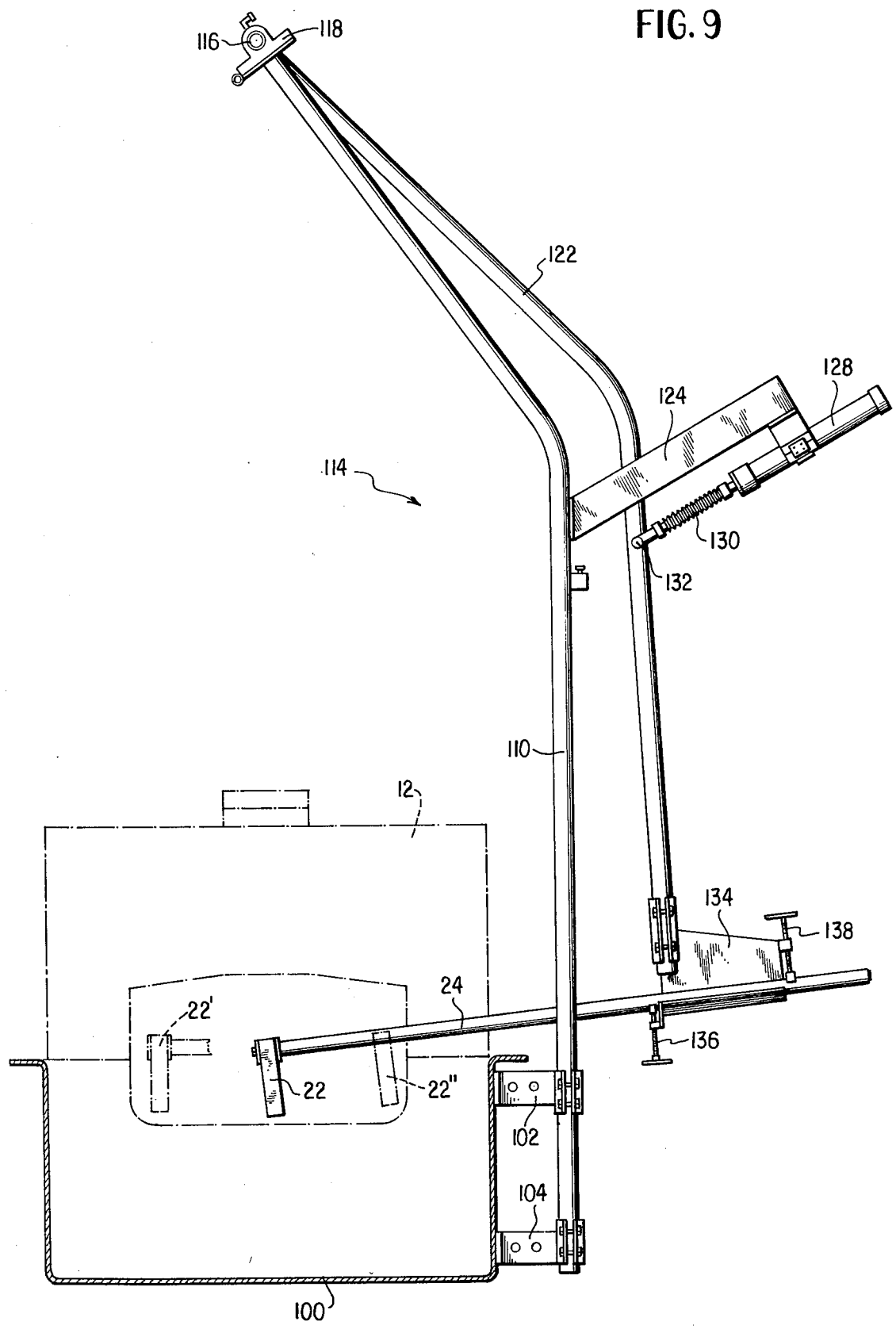
FIG. 9 is a side view showing a detailed drive linkage for the paddle.
Figure 10:
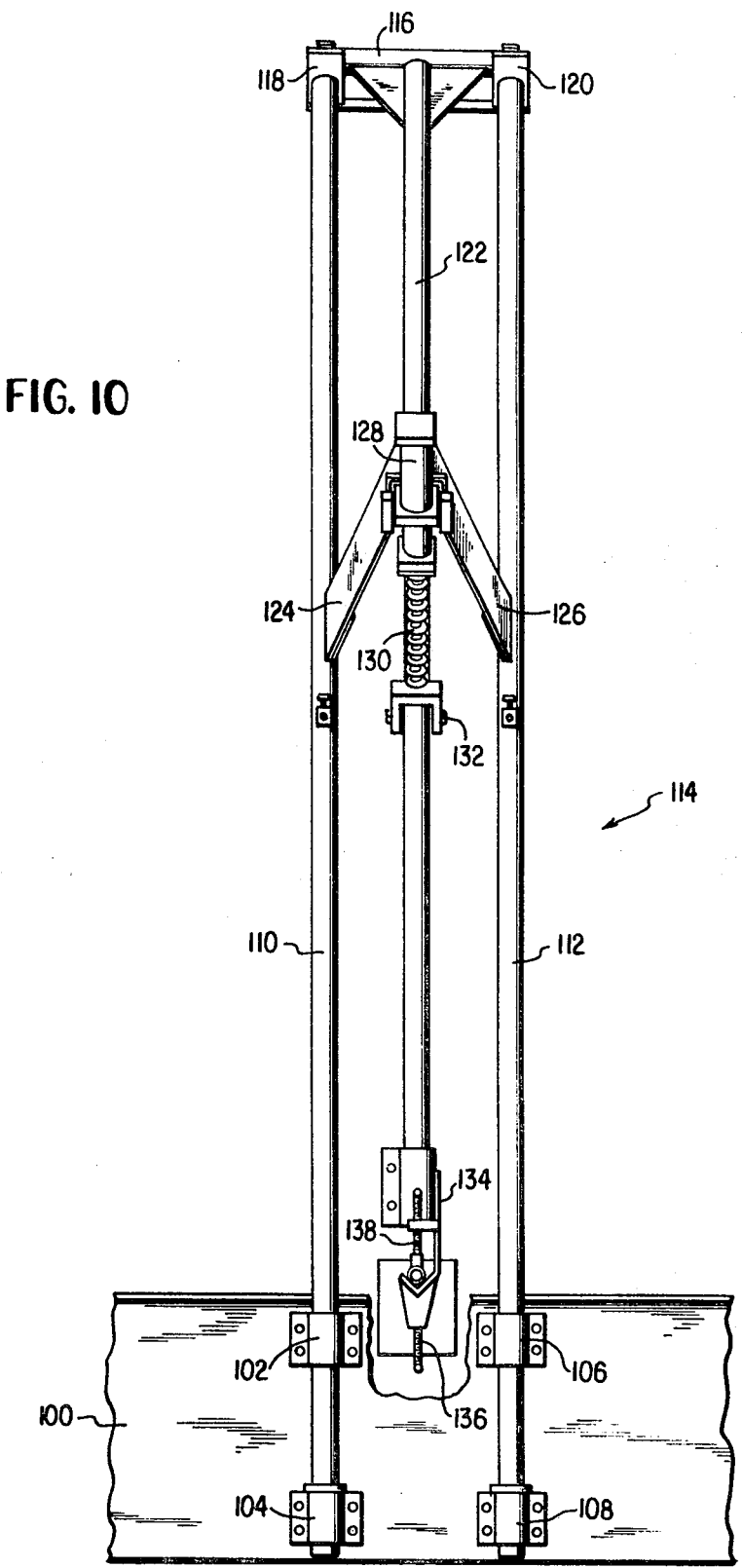
FIG. 10 is an end view of the detailed drive linkage of FIG. 9.

FIGS. 9 and 10 show a detailed construction for a drive arrangement of the mixer in accordance with the present invention. Referring to FIG. 9 the forehearth 12 indicated in phantom, is shown as received in a metallic forehearth can 100 having attached to one side mounting brackets 102, 104, 106 and 108 which as shown in FIG. 10 support the legs 110 and 112 of a linkage drive frame generally indicated at 114. At the upper end or curved end of the frame is a rotatable shaft 116 supported in bearings 118 and 120 and having secured to it a swing arm 122. Supported from the legs 110 and 112 and forming part of the frame, are a pair of cylinder supports 124 and 126 which support an air cylinder assembly 128 connected by a piston rod 130 and pivot 132 to the swing arm 122. The lower end of the swing arm 122 carries a rod support assembly 134 with clamps 136 and 138 for attachment to the end of rod 24.

FIG. 11 shows a preferred clawing action according to this invention which may be achieved with, for example, the drive arrangement of FIG. 2A, or FIG. 5. In this embodiment, the paddle 22 advances across the channel of glass 20 from the center thereof rising about two inches, and continuing at this higher level to side wall 12. The glass underneath the panel then escapes, and thus is not pushed over the wall 12. At the reversal of the stroke, the paddle 22 is allowed to drop to a location near the bottom corner of the channel 20. The paddle then catches the relatively cold glass at the corner and returns along the bottom 16 disturbing the cold glass adjacent thereto, to about the midpoint where paddle 22 again rises to the higher level shown in FIG. 11.

The clawing action shown, or double clawing action, at each side wall 12 need not necessarily be a symmetrical "Figure Eight," as shown, and the paddle need not rise at exactly the mid-point of the channel. As will be obvious to those skilled in the art, the purpose of this double clawing action is to mix colder glass along the bottom of the channel with the hotter surface glass, and this purpose can be achieved by approximating the "Figure Eight" motion.

Because glass is very viscous, there is a considerable drag up to about one inch or so away from paddle 22. Therefore, paddle 22 will normally travel about one inch above bottom 16 of channel 20 as the paddle 22 travels from a side wall 12 toward the mid-point of channel 20. This will cause the glass on that side of the channel to move massively toward the center with some escaping around the edges of paddle 22.

When paddle 22 lifts as it approaches a side wall 12, the glass beneath it remains relatively undisturbed. However, when the paddle 22 returns from wall 12 toward the mid-point of the channel, this glass is disturbed. Normally, the paddle 22 would approach each side wall 12 no closer than about one inch. This is sufficient to mash the glass against the side wall and cause disturbance of substantially all glass disposed adjacent each side wall. Therefore, the stirring action of FIG. 11 will move all glass in the flow channel, mixing the colder glass adjacent the walls and bottom thereof with the hotter glass located in the center and surface.

FIGS. 12 and 13 show additional embodiments of drive assemblies which can achieve the motion described in FIG. 11. As will be obvious to those skilled in the art, the general motion achieved by the embodiment of FIGS. 9 and 10 may also be accomplished by other mechanisms.

With attention to FIG. 12, rod 24, mounting paddle 22, carries a rod support assembly 150. A linkage drive frame 152 is attached thereto, and consists of a pair of air cylinders 154 and 156. Cylinder 156 drives leg 158 horizontally in an oscillating motion. Cylinder 154, through swing arm 160, causes rod 54 to pivot about a pivot point 162 to cause paddle 22 to rise and drop in channel 20.

With attention to FIG. 13, paddle 22 is mounted at an end of a U-shaped leg 164. Cylinder 168 is connected to leg 164 and causes said leg to oscillate horizontally as wheels 170 and 172 travel along track 174. Opposed, hinged, ramps 176 and 178 are also provided on track 174. Accordingly, wheel 170 ascends ramp 176, drops from the end thereof, and returns along track 174 to ascend ramp 178, drop from the end thereof, and return along track 174. The drive action of cylinder 168, in conjunction with the action of wheel 170 on ramps 176 and 178, and track 174 results in a motion applied to paddle 22 approximating that shown in FIG. 11.

With attention to FIG. 14, it is not essential to this invention, that paddle 22 travel normal to the direction of flow in channel 20. In fact, paddle 22 may move laterally as well as back and forth across channel 20. As shown in FIG. 14, rod 24 may pivot about block 190 while an end thereof is affixed to a rotating wheel 192. In this fashion, paddle 22 may travel both back and forth across channel 20 while moving laterally with and against the flow of glass in channel 20.

It is apparent from the above, that the present invention provides an improved molten glass homogenizer and, particularly, one in which the paddle is provided with upwardly and downwardly extending apertures and in which the drive arrangement imparts a lift, a drop, and lateral movement to the paddle. One illustration of this is in FIG. 9 where the extreme positions of the paddle at each end of the forehearth are illustrated in phantom at 22' and 22" which positions of the paddle are higher above the floor of the forehearth than the central solid line position illustrated. This is brought about by placing the pivot shaft 116 in the same plane as the center line of the forehearth which represents the lowermost position of the paddle, i.e., the paddle is closest to the floor of the forehearth when it is halfway across. In some embodiments, automatic raising and lowering of the blades is obtained by the eccentric nature of the linkage involved. Other more sophisticated raising and lowering actions may be obtained through the use of an additional air cylinder, as illustrated in FIGS. 2A, 5 and in FIGS. 12 and 13, in conjunction with appropriately positioned microswitches adapted to be intercepted by the swing arm at the proper point in the cycle to raise and lower the support rod 24 and, therefore, the paddle 22 on its end. While the drive means has been described throughout as an air or pneumatic cylinder, it will be obvious to those skilled in the art that the drive means could be a hydraulic cylinder, a crank or a crank arm used to achieve the motion of FIG. 11, an electric motor driving a reversing chain. This invention contemplates any conventional drive means which will produce the motion shown in for example FIGS. 9, 11 or 14. The essential feature of the drive means is to cause an oscillation of the blade or paddle whereby all of the glass across a channel will be disturbed and stirred. Finally, the paddle as shown in FIG. 14 may move laterally as well as across the channel, or if combined, as would be obvious to one skilled in the art, with the drive means of for example FIGS. 2A, 5, 12 or 13 so that rod 24 or 164 is also affixed to the rotating wheel 192 with a pivot point intermediate to the wheel 192 and paddle 22, the paddle may be driven laterally across the channel with a raising and lowering motion as shown in FIG. 11.

While specific embodiments of the invention have been shown and described in detail, it will be understood that the invention may be modified without departing from the spirit of the inventive principles as set forth in the hereafter appended claims.

What is claimed is:

1. A glass mixing arrangement comprising a glass forehearth having a channel through which molten glass flows, a plate forming a paddle in said forehearth, said plate being oriented in said channel to present its thinnest dimension to the glass flow in said channel whereby said paddle presents a minimum impedance to the flow of glass through said channel, a drive rod coupled to said paddle and extending out of said forehearth, and oscillatory drive means coupled to said rod for driving said paddle with substantially reciprocating motion transversely across said channel from adjacent one forehearth side wall to the other with the lower edge of said paddle near the bottom of the forehearth, said drive means including means for imparting a lifting and lowering motion to said paddle as it passes through each cycle of reciprocation to enhance the mixing of glass at one level in the forehearth with glass at another level in the forehearth.

2. A mixing arrangement according to claim 1 wherein said oscillatory drive means comprises at least one air or hydraulic cylinder.

3. A mixing arrangement according to claim 1 wherein said drive means comprises a swing arm pivoted above said forehearth and coupled to said drive rod.

4. A mixing arrangement according to claim 3 wherein said swing arm is pivoted above the centerline of said forehearth whereby said paddle is nearest the floor of said forehearth at its center.

5. A mixing arrangement according to claim 4 including an auxiliary arm and second air cylinder coupling said swing arm to said drive rod for selectively raising and lowering said paddle relative to the floor of said forehearth during a reciprocation of said paddle across said forehearth.

6. A mixing arrangement according to claim 5 wherein said second air cylinder couples the upper end of said auxiliary arm to said swing arm.

7. A mixing arrangement according to claim 6 wherein said second air cylinder is pivoted at one end to said swing arm and is pivoted at its other end to said auxiliary arm, the lower end of said swing arm also being pivoted to said auxiliary arm.

8. A mixing arrangement according to claim 7 wherein the lower end of said auxiliary arm carries a clamp receiving the end of said drive arm.

9. A mixing arrangement according to claim 2 wherein a first air cylinder is coupled to said rod, means for pivotally supporting said first air cylinder coupled thereto and a second air cylinder is coupled to said rod between said first air cylinder and said paddle whereby said first air cylinder drives said paddle transversely across said channel and said second air cylinder imparts a lifting and lowering motion to said paddle.

10. A mixing arrangement according to claim 1 wherein said means for imparting a lifting and lowering motion to said paddle include ramp means and cam follower means coupled to said rod for following said ramp means as said paddle travels transversely across at least a portion of said channel.

11. A mixing arrangement according to claim 1 wherein said oscillatory drive means includes means for driving said paddle laterally as it moves transversely across said channel.

12. A glass mixing arrangement comprising a glass forehearth having a channel through which molten glass flows, a plate forming a paddle in said forehearth, said plate being oriented in said channel to present its thinnest dimension to the glass flow in said channel whereby said paddle presents a minimum impedance to the flow of glass through said channel, a drive rod coupled to said paddle and extending out of said forehearth, drive means coupled to said rod for driving said paddle with substantially reciprocating motion transversely across said channel and laterally thereto from adjacent one forehearth side wall to the other with the lower edge of said paddle near the bottom of the forehearth so that substantially all glass across said channel will be disturbed by said reciprocating motion.

13. The mixing arrangement of claim 12 wherein said drive means includes means for driving said plate in a reciprocal motion whereby said plate approaches each of said side walls at an acute angle thereto so that glass adjacent said edge will be disturbed by said plate.

14. A glass mixing arrangement comprising:
a glass forehearth having a channel with sidewalls and a bottom through which molten glass flows;
stirrer means disposed in said channel for mixing molten glass in the channel to mix molten glass adjacent the sidewalls and bottom thereof with the flow of molten glass without substantially impeding the flow thereof, said stirrer means including a lower surface disposed adjacent the bottom of the channel, front and rear surface portions disposed substantially facing respective sidewalls of the channel, said stirrer means having a dimension transverse to the flow of glass sufficiently small to avoid substantially impeding the flow of molten glass in said channel;
a drive rod coupled to said stirrer means and extending out of said forehearth;
and oscillatory drive means coupled to said rod for driving said stirrer means with substantial reciprocal motion transversely across said channel from adjacent one forehearth sidewall to the other with a motion causing the surfaces of said stirrer means to disturb the molten glass adjacent each sidewall and the bottom of said channel to mix said molten glass with the flow of molten glass in the channel and to disturb substantially all glass across said channel by said reciprocal motion.

15. The arrangement of claim 14 wherein said drive means includes means for driving said stirrer means in a reciprocal motion whereby said stirrer means approaches each of the sidewalls at an acute angle thereto so that the glass adjacent the edge will be disturbed by said stirrer means.

16. The arrangement of claim 14 wherein said drive means includes means for driving said stirrer means with substantially reciprocal motion transversely across said channel and laterally thereto from adjacent one forehearth sidewall to the other with the lower surface of said stirrer means adjacent the bottom of said channel.

17. The arrangement of claim 14 wherein said drive means includes means for imparting a lifting and lowering motion to said stirrer means as said means passes through each cycle of reciprocation.

18. Method of mixing molten glass flowing along a glass forehearth including a channel having sidewalls and a bottom, so that molten glass adjacent the sidewalls and bottom is uniformly mixed with molten glass in the flow thereof comprising the steps of:

providing a stirrer means disposed in said channel for mixing said glass, said stirrer means having a lower surface disposed adjacent the bottom of the channel and front and rear surface portions disposed substantially facing respective sidewalls of the channel;

driving said stirrer means with a substantial reciprocal motion transversely across said channel from adjacent one sidewall to the other and across said bottom to disturb substantially all molten glass adjacent the sidewalls and bottom with each reciprocal cycle and mix said glass with the flow of molten glass.

19. The method of claim 18 further comprising:

driving said stirrer means transversely across said channel and laterally thereto from adjacent one sidewall to the other with the lower surface disposed adjacent the bottom.

20. The method of claim 18 further comprising driving said stirrer means with a lifting and lowering motion as it passes through each cycle of reciprocation.

* * * * *